United States Patent Office 3,502,691
Patented Mar. 24, 1970

3,502,691
CERTAIN (5-NITRO-2-FURYL)TRIAZOLES
Eva B. Akerblom, Uppsala, Sweden, assignor to Pharmacia AB, Uppsala, Sweden, a Swedish company
No Drawing. Filed Feb. 10, 1967, Ser. No. 615,087
Claims priority, application Sweden, Feb. 14, 1966, 1,831/66
Int. Cl. C07d 55/06; A61k 27/00
U.S. Cl. 260—308                     3 Claims

ABSTRACT OF THE DISCLOSURE

The present invention concerns novel 5-nitro-2-furans and a process for the preparation thereof.
The novel compounds are of the Formula I

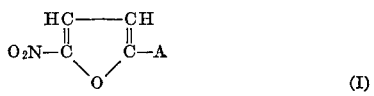

(I)

wherein A represents a member selected from the group consisting of radicals having the general Formulae II and III

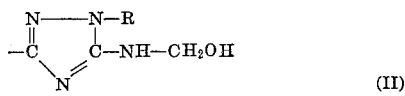

(II)

and

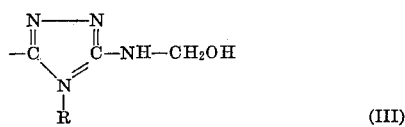

(III)

wherein R represents an alkyl, containing from 1 to 4 inclusive carbon atoms.
The invention also encompasses therapeutically acceptable salts thereof. The compounds have antibacterial properties.

---

DETAILED DESCRIPTION OF INVENTION

The novel compounds have been shown to possess excellent anti-bacterial properties in urine excretion tests. The compound 3-hydroxymethylamino-4-methyl-5-(5-nitro-2-furyl)-1,2,4-triazole (A) has been particularly tested in these experiments. The compound 3-amino-4-methyl-5-(5-nitro-2-furyl)-1,2,4-triazole (B) and a well known urinary tract antiseptic, nitrofurantoin (C), often used in therapeutical practice, were used as comparison compounds. The results are evident from the following table 1 which also discloses the emetic effect on cats $ED_{50}$ in mg./kg., the "acute oral toxicity $LD_{50}$ on mice in mg./kg." and "excretion on dogs at a dosage of 5 mg./kg. in percent of a given dosage found in urine" (determined microbiologically). The bacteriological index discloses the anti-bacterial effect against *E. coli*, determined in accordance with the cup-plate method in vitro. The effect of the nitrofurantoin has been made equal to one.

TABLE

| Compound: | Emetic effect on cats $ED_{50}$ (mg./kg.) | Acute oral toxicity $LD_{50}$ mice (mg./kg.) | Excretion on dogs at a dosage of 5 mg./kg. in percent of the given dose found in urine (microbiologically determined) | Bacteriological index |
|---|---|---|---|---|
| A | 100 | 3,380 | 10 | 1.3 |
| B | >100 | | 2 | 2.5 |
| C | 5 | 895 | 17 | 1 |

A measure of the anti-bacterial activity in urine can be obtained by multiplying excreted dosages with the bacteriological index. The following values are then obtained:

A _____ 13
B _____ 5
C _____ 17

When used in the same dosage nitrofurantoin is thus slightly more effective than compound A. The compound A, however, shows decisively better properties than nitrofurantoin (C) with respect to toxicity and emetic effect. The latter compound causes vomitting in 50 percent of cats which receive 5 mg./kg. per body weight. In therapeutical practice at the most 3 mg./kg. body weight is normally given each day. This low dosage, however, causes secondary effects in the form of vomitting in approximately 10 percent of the cases. As can be seen from the table, the compound A does not produce the same vomitory effect on cats until the dosage has been raised 20 times.

The compound A thus presents a better combination of properties than the remaining compounds with respect to its suitability as a urine antiseptic.

According to the invention, the novel compounds having the Formulae I–III above can be prepared by reacting 2- or 4-lower alkyl substituted 5-(5-nitro-2-furyl)-1,2,4-triazole having the formula

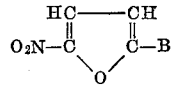

wherein B represents a radical having, respectively, the formulae

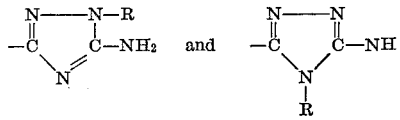

wherein R has the above significance, with formaline or a reactive derivative thereof. The process compound is recovered as such or as a therapeutically acceptable salt thereof.

The invention will be described in the following by two examples which are intended to illustrate the invention.

EXAMPLE 1

3-hydroxymethylamino-4-methyl-5-(5-nitro-2-furyl)-1,2,4-triazole 260 ml. of 40 percent formaline solution were added to a suspension of 105 g. (0.5 mol) of 3-amino-4-methyl-5-(5-nitro-2-furyl)-1,2,4-triazole in 165 ml. of dimethyl formamide. The mixture was heated for four hours at 90°. Subsequent to being cooled the undissolved substance was removed by filtration. The filtered substance was washed with acetone and dried in a vacuum dryer at 100° C. for 12 hours. 99 g. of 3-hydroxymethylamino-4-methyl-5-(5-nitro-2-furyl)-1,2,4-triazole were obtained. Melting point 201–204° C. (dec.).

*Analysis.*—Calculated (percent): C, 40.2; H, 3.8; N, 29.3. Found (percent): C, 40.3; H, 4.0; N, 29.3.

EXAMPLE 2

3-hydroxymethylamino-2-methyl-5-(5-nitro-2-furyl)-1,2,4-triazole 12.5 ml. of 40 percent formaline solution was added to a suspension of 5 g. (0.024 mol) of 3-amino-2-methyl-5(5-nitro-2-furyl)-1,2,4-triazole in 10 ml. of dimethyl formamide. The mixture was heated for 4 hours at 90° and a clear solution was obtained. On cooling, a small amount of substance precipitated and was removed by filtration. Water was then added to the mother liquor, 3 - hydroxymethylamino - 2 - methyl-5-(5-nitro-2-furyl)-1,2,4-triazole precipitating. The substance was filtered off and washed with acetone. Melting point 151–154° C. (dec.).

*Analysis.*—Calculated (percent): C, 40.2; H, 3.8; N, 29.3. Found (percent): C, 40.7; H, 4.3; N, 29.1.

What is claimed is:
1. A compound of the formula:

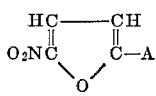

wherein A is a member selected from the group consisting of, respectively

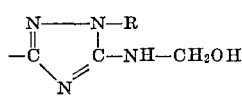

and

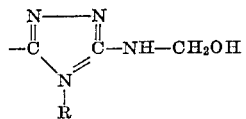

wherein R represents an alkyl, containing from 1 to 4 inclusive carbon atoms, and therapeutically acceptable salts thereof.

2. 3-hydroxymethylamino-4-methyl-5-(5-nitro-2-furyl) 1,2,4-triazole.

3. 3-hydroxymethylamino-2-methyl-5-(5-nitro-2-furyl)-1,2,4-triazole.

References Cited

Walker, Formaldehyde (New York 1953), pages 281 and 288.

ALTON D. ROLLINS, Primary Examiner

U.S. Cl. X.R.

424—269.